Nov. 29, 1955 V. STOLL 2,724,899

SURVEYING DEVICE

Filed June 7, 1947 4 Sheets-Sheet 1

INVENTOR
Victor Stoll
BY Lackenbach & Hirschman
ATTORNEYS

SURVEYING DEVICE

Filed June 7, 1947 4 Sheets-Sheet 2

INVENTOR
Victor Stoll
BY
Lackenbach & Hirschman
ATTORNEYS

Nov. 29, 1955 V. STOLL 2,724,899

SURVEYING DEVICE

Filed June 7, 1947 4 Sheets-Sheet 3

INVENTOR
Victor Stoll
BY
Lackenbach & Hirschman
his ATTORNEYS

Nov. 29, 1955 V. STOLL 2,724,899

SURVEYING DEVICE

Filed June 7, 1947 4 Sheets-Sheet 4

INVENTOR.
Victor Stoll
BY
Armand E. Lackenbach
Attorney

United States Patent Office 2,724,899

Patented Nov. 29, 1955

2,724,899

SURVEYING DEVICE

Victor Stoll, New York, N. Y.; Sima Stoll, executrix of the estate of said Victor Stoll, assignor of one-half to Milton Stoll, New York, N. Y.

Application June 7, 1947, Serial No. 753,271

14 Claims. (Cl. 33—174)

This invention relates to a surveying and centering device consisting of two elements, one upper and one lower, in which is incorporated a spherical sector having an automatically fixed and constant center, three dimensional orientation planes, convex and concave congruent surfaces at a distance of four inches from the center laid out on a flexible strip; two intersecting vertical planes, the median and transverse, each plane graduated to scale from the central axis of intersection of the two vertical planes, which axis is the diameter of the sphere, and a three point spherical divider.

The device of the invention, embodying in one instrument, all the above mentioned features is well adapted to be utilized to determine the geometric design of the human dental apparatus and to survey the parts of the same. Each arch, upper or lower, can be surveyed separately and symmetry or asymmetry determined and therefore its normality or its deviation from normal, established. It ideally serves to disclose the natural normal geometric design of a dental arch of which the teeth form the outline of the arch or the outline of the ridges in an edentulous case. The device has also a means which can be used to attach the same with modelling compound to the dental cast after it has been surveyed and carried into a dental surveyor and coordinator of the type disclosed in my pending application, Serial No. 745,307 filed May 1, 1947, to harmonize with the center and planes of such surveyor and coordinator. It can also be inserted, for purposes of stabilization, into any vertical bushing of any frame.

After the cast is attached with plaster to the model holders of the dental surveyor and coordinator, the surveying and centering device of the present invention can be removed and the dental casts left in proper relationship to the center and orientation planes of the surveyor and coordinator which then represents the center and orientation planes of the dental mass.

It is recognized today that in all dental restorations, the fundamental goal sought by the dental practitioner is balanced occlusion, the way it is found in the normal natural dentition. Only when there is balanced occlusion, which means contact between the occlusal surfaces of the upper and lower teeth in any position of the lower jaw in relation to the upper jaw, in centris and in eccentric lateral positions, are normal physiological functions of the human dental apparatus possible. In an unbalanced occlusion or malocclusion, there is always trauma due to pathological mechanics which causes the destruction of the elements of the dental mechanism. Normal functioning of the human dental machine is impossible without the proper structural arrangement of all the parts in correct alignment. Structure and function are interdependent. This concept is the basis for diagnosis and the guide for all dental operations in dental mechanics.

The primary object in diagnosis of the human dental mechanism, for the purpose of obtaining balanced occlusion, is the analysis for its structural design and the correct position of each element of it therein. Only when all the parts are correctly aligned statically in centric relation, is it possible to attain normal dynamics of the human dental machine, which consists of the complicated movements of the mandible against the maxilla, or the sliding and gliding of the occlusal surfaces of the mandibular teeth against the occlusal surfaces of the maxillary teeth in balanced contact with each other in any position. The first step, then, consists of surveying the dental machine structurally. This cannot be accomplished without precision geometric tools which the dental instruments should constitute. There is no dental instrument at present which carries out this approach and therefore the results are inaccurate.

It is therefore the main object of this invention to provide a surveying device with a collection of elements of geometric nature, which will enable the dentist simultaneously to find the geometric form of the architecture of a dental arch with all its structural elements in detail and with precision. Such surveying device gives automatically the center of the curvature of a sphere of a four inch radius on the Celluloid strip (or any other flexible strip) which can be adapted by the sliding posts in the device on a concentric slotted rib to any shape of a dental arch, always, however, maintaining the same center. The four inch radius is the normal, accepted radius of the human dental arch, both of adult and child, the arch of the latter occupying smaller area of a spherical sector but being of the same curvature.

Two circular slotted ribs of my device, being attached to each other perpendicularly, give automatically the two vertical planes, the median and transverse. The intersection of these two planes forms the central axis of the device and represents the radius of a sphere. The tangent to this sphere at this radius which forms the central axis is the horizontal plane of the surveyor and coordinator. The dental cast is located in this system of coordination, the three above mentioned planes being reference planes when the adjustable strip is conformed to a natural line on the teeth of the dental arch. Any natural line can be used, for example, the line of the grooves, the line of the tips of the cusps or the ridge line in endentulous cases. Any deviation from the normal may be discovered by inspection and comparison of the indications of the device in the dental mass in question.

Still another object of this invention is to provide a surveying device which will enable the dental practitioner to locate with precision, outside of the mouth of the patient, on a dental cast made from the patient's teeth, the exact normal outline of the upper and lower dental arches and indicate the corrections necessary to bring either dental arch into normal alignment with the other one.

Another object of this invention is to provide a surveying device which may be used in any art wherein it is necessary to plan in accordance with three dimensional planes such as sculpturing, for example.

Another object of this invention is to provide a device which can correctly determine the structural arrangement of all the parts of the human dental mechanism in balanced occlusion. Other objects and advantages will appear from the following description considered in connection with the accompanying drawings.

Figures 1, 2, 3, 4:
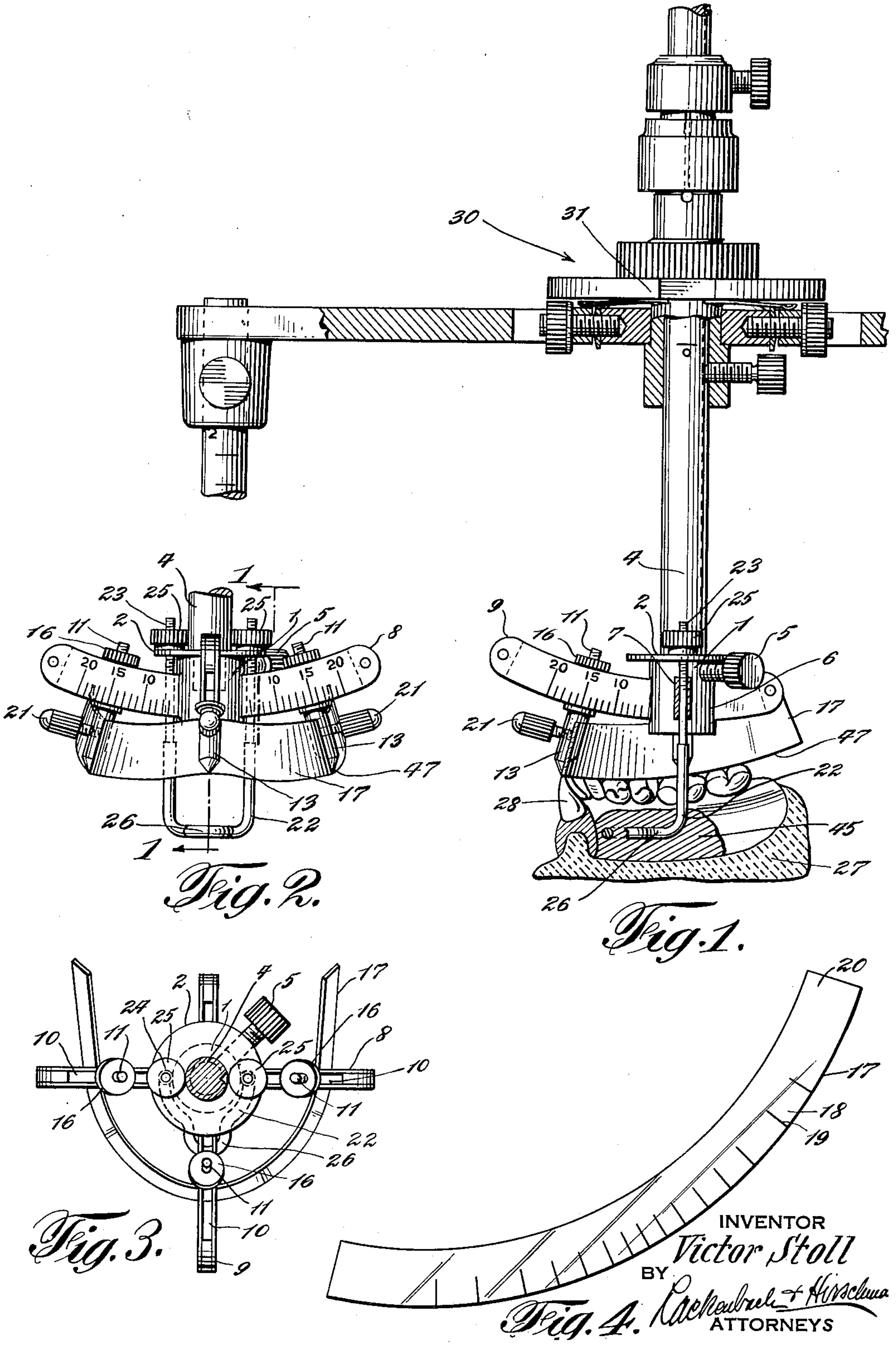
Fig. 1 is a side view of the surveying and centering device partially in section carrying the lower cast to which it is attached with modelling compound and is mounted in the center of the surveyor and coordinator referred to, thus orienting the lower cast correctly with its center of the concave curvature and its orientation planes of the surveyor and coordinator.
Fig. 2 is a front view of the surveying and centering device.
Fig. 3 is a plan view of the surveying and centering device shown in Fig. 2.
Fig. 4 is a Celluloid strip for the upper member of the device and the lower jaw showing the layout of the individual teeth of the dental arch, and conforming to a spherical surface of a four inch radius.

Referring now to the drawings and in particular to the surveying device shown in Figs. 1, 2, 3 and 4, this surveying device comprises a bushing 1 having a disc-like shoulder 2 thereon. Drilled through the center of said bushing 1 is an aperture adapted to receive a rod 4 which is slidable within said aperture of said bushing 1. A tightening screw 5 is screwed through the side wall 6 of said bushing 1 to make friction contact with said slidable rod 4 in order to hold it in position within said aperture 3. Spaced 90° apart around said bushing 1 are ribs 8 and 9 which extend outwardly from the outer wall 6 of said bushing 1. Any convenient scale markings may be used on said ribs 8 and 9 with the scale markings starting at zero in the middle of said aperture 3 of said bushing 4. Along the length of said ribs 8 and 9 are grooves 10 which run through said ribs 8 and 9 and are adapted to receive the threaded thin ends of slidable rods 11 said rods 11 having an enlarged portion 13 with a slot 14 therein. A washer 15 encompasses the enlarged portion 13 of said rods 11 and a locking nut 16 is threaded on the threaded thin ends 12 in such a manner that the ribs 8 and 9 are pinched between said washers 15 and said locking nuts 16 to hold said rods 11 in a predetermined position along the grooves 10 of said respective ribs 8 and 9. A flexible strip 17 made of Celluloid or other suitable material is cut in the shape of a portion of the area between two concentric circles; the outer circle being of the radius of the spherical sector desired to be incorporated in the device. The strip 17 is adapted to fit within said slots 14 of said enlarged portion of said rods 11. Said flexible strip 17 has spaces 18 indicated by lines 19 on its outer surface 20 to indicate the normal relative position of the teeth in the human dental arch. Said flexible strip is held within the slots 14 of said rods 11 by means of lock screws 21 and may be removed by backing up said lock screws 21. When said flexible strip 17 is fitted within the three slots 14 as shown in Fig. 3, said flexible strip 17 forms the outline of the upper or lower dental arch depending on the position in which it is placed. An L-shaped looped rod 22 having its elongated ends 23 threaded and thrust through the openings 24 in said shoulder 2 of said bushing 1, is held to said shoulder 2 by means of knurled nuts 25 tightened on the threaded ends 23 of said L-shaped looped rod 22. The looped portion 26 of said L-shaped looped rod 22 is adapted to support an upper or lower model cast 27 of the teeth 28 in a manner which will be described hereinafter.

Figure 5:
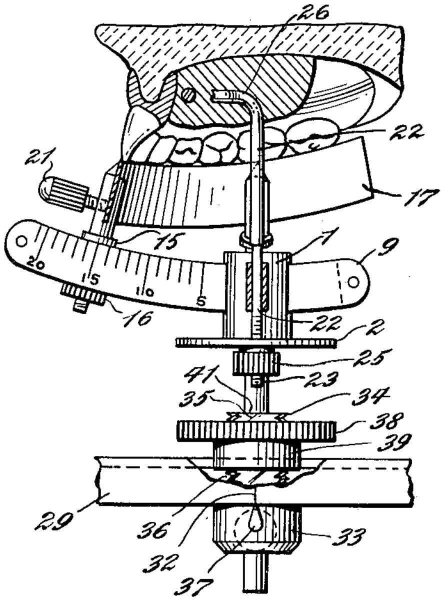
Fig. 5 is an elevational view of the surveying centering device mounted within the base of the surveyor and coordinator partially in section and holding an upper model cast with the lower part of the device and orienting the upper cast with its convex curvature and orientation planes in harmony with the center and orientation planes of the surveyor and coordinator.
Figure 7:
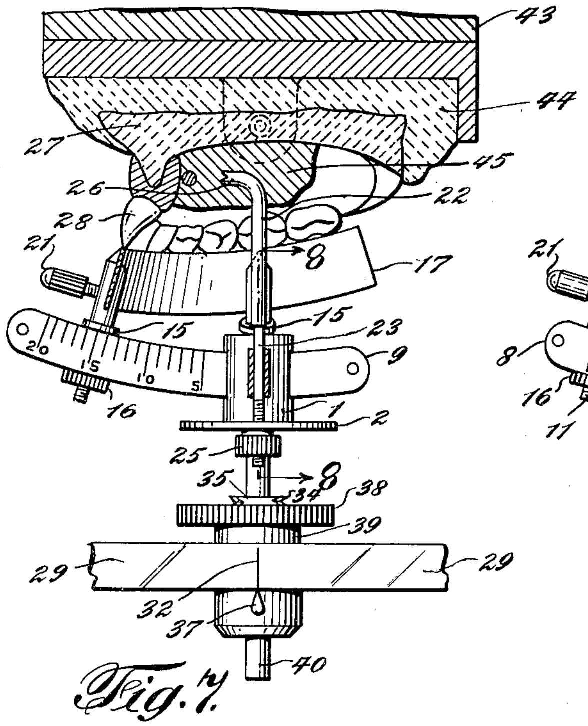
Fig. 7 is an elevational view of the surveying device shown in Fig. 5 with the upper model holder plate in section.
Figure 8:
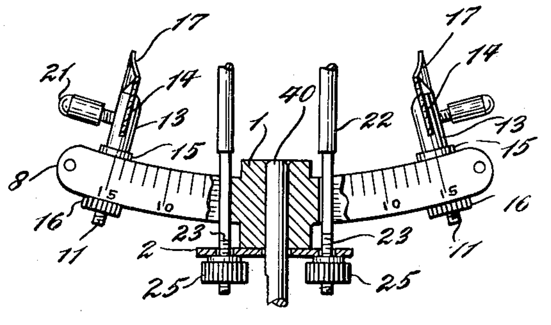
Fig. 8 is a partial sectional view of Fig. 7 taken along the lines 8—8.

Referring now to the surveying device shown in Figs. 5 and 7 of the drawings, the surveying device is shown attached to the base 29 of said supporting frame 30 instead of the rod 4 of the flexible gimbal 31 as shown in Fig. 1. This arrangement is used when the upper dental apparatus is to be surveyed.

Said base 29 has a centering line 32 marked thereon which is used as a guide for the surveying device. A receptacle 33 has a threaded hollow shaft 34 passing therethrough. Said threaded hollow shaft 34 has two opposing recesses 35 filling into a slot of the coordinator to prevent said shaft 34 from rotating within the aperture 36 in the base 29. Jutting out from the front of said receptacle 33 is a pointer 37 which is used to line up the surveying device with the centering line 32 on the base 29. A knurled knob 38 having a shoulder 39 is adapted to thread unto said shaft 34 and tighten said indicating bushing 33 to the base 29. A shaft 40 is fitted within said bushing 1 of the surveying device and is adapted to slide freely within the aperture 41 of said hollow shaft 34 and thus raise and lower said surveying device to a predetermined position. Said shaft 34 may be locked in position by means of a knurled headed screw which screws into an opening in said receptacle 33 opposite the position of the pointer 37 jutting from the front of said bushing 33.

An upper plate 43 is adapted to hold plaster of Paris 44 so that the mold cast 27 of either the upper or lower dental apparatus may be held firmly in said plaster of Paris mold 44. A modeling compound 45 is employed to hold the dental mold cast 27 to the L-shaped looped rod 22 of the surveying device when the correct position is established.

Figure 6:
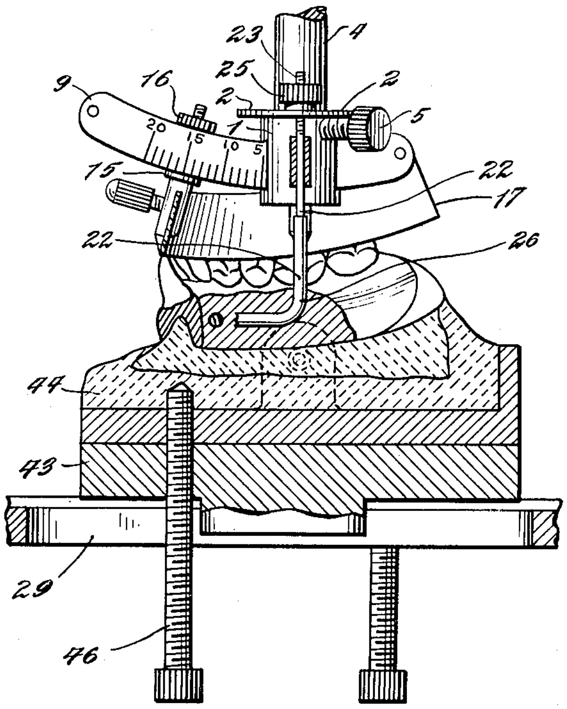
Fig. 6 is an elevational view of the upper surveying device partially in section and mounted on the base of the surveyor and coordinator and carrying the lower dental cast and attached with plaster to the model holder plate of the surveyor and coordinator.

In order to provide the proper alignment of said plaster of Paris holding plate 43, a group of leveling screws 46 thread through said base 29 and into the plate 43 and the plaster of Paris 44 to level said plate 43 when the lower model cast is being used in connection with the surveying device as shown in Fig. 6.

Figure 9:
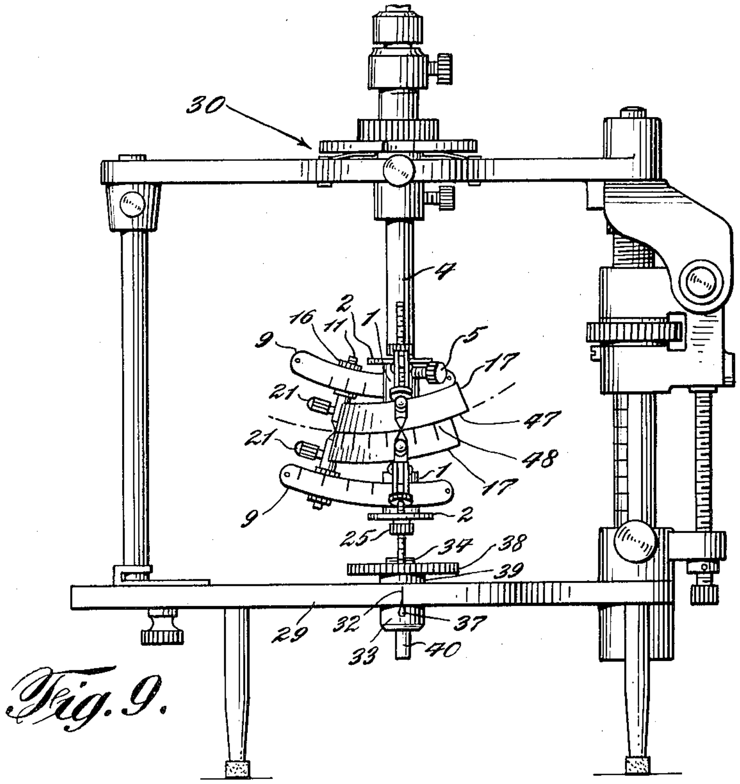
Fig. 9 is a perspective side view of the upper and lower surveying devices positioned in the supporting frame.

In Fig. 9, the upper and lower surveying devices are shown lined up in position which is the theoretic center line of the dental mass. The spheric line of the teeth edges is shown theoretically by the curved lower surface 47 of the upper flexible strip 17 in contact with the curved upper surface 48 of said lower flexible strip 17.

Figure 10:
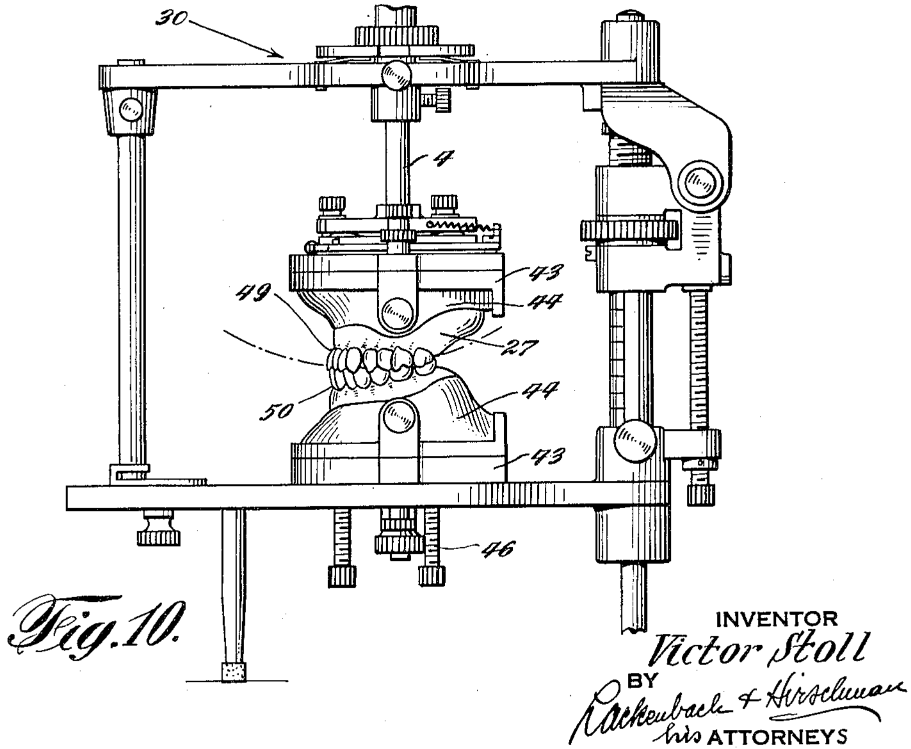
Fig. 10 is a completed set up of a full upper and lower case derived pattern from the surveying device shown in Fig. 9.

In Fig. 10 the completed set up of a full upper and lower case 49 and 50 shown in the derived pattern obtained from the theoretical positions established in Fig. 9.

The operation of the device in as follows:

In surveying the dental mass, the dental practitioner may start with either the lower or upper dental apparatus in finding the center position and then match and line up the other dental structure with it. Using the upper surveying device of Figs. 1 and 2, in connection with the lower dental model cast 27, the surveying device is locked into the rod 4, of the adjustable frame 30 which is fully described in my application filed concurrently herewith, by means of the locking screw 5 which is tightened against the rod 4 after it has been inserted to the correct depth in the aperture 3 of the bushing 1. A lower model cast 27 of the patient's teeth 28 is now set in a plaster of Paris compound 44 held firmly in plate holder 43. Rod 4 is now lowered until the flexible strip 17 of the surveying device comes in contact with the teeth 28 in the model cast 27.

The front pointer 13 is placed directly between the two central incisor teeth 28 and the lower edge 47 of said flexible strip 17 will fall along the outer ridge of the teeth 28 of said lower dental arch. When this position is found, a bit of modeling compound 45 is melted around the looped portion 26 of the L-shaped looped rod 22 and permitted to solidify, which results in the model cast 27 and the plate 43 being held firmly to said L-shaped looped rod 22 and thus said apparatus is held in position for further examination and study.

Loosening the tightening nuts 16 on the rod 11, said enlarged portion 13 of said rod 11 which holds said flexible strip 17 in position, may be moved within the grooves 10 of the rib 8 or 9. This adjustment permits the dentist to move said flexible strip 17 to conform with the arch of the teeth 28 under examination. After the flexible strip 17 has been adjusted to follow the outer line of the patient's teeth, then the dentist can tell by the readings of the scale along the ribs 8 and 9 the extent of the teeth deviations away from the normal and what corrective measures must be taken.

In addition to the horizontal alignment of the teeth, the markings 19 on said flexible strip 17 will show wherein any of the teeth are tilted out of line and the amount of encroachment on neighboring teeth.

Also, the spherical curve of the lower surface 47 of said flexible strip 17 will indicate which teeth are off this spheric line in that they are too high or too low in comparison with the normal teeth from which said spheric line was derived. Said teeth may then be built up to meet this spheric line if too short or ground down if too long.

When all corrections have been adjusted to the normal spheric curve, the modeling compound 45 is melted and the surveying device removed from the model cast 27 which is now attached firmly to the base 29 of the supporting frame 30 as shown in Fig. 6. The supporting frame 31 is now tilted up on its axis and the surveying device is removed from the rod 4 by backing up the tightening screw 5 in the bushing 1. The upper model cast 27 of the patient's teeth is now placed in the plaster of Paris holding plate 43 and the whole set up is suspended from the rod 4 in such a position that said upper teeth are lined up as much as possible with the corrected teeth in the lower dental arch.

By comparing the position of the upper with the lower teeth, the dentist can now make the necessary survey and correction of the upper teeth to bring them on the spheric line set by the corrected lower teeth.

As the necessary corrections are being made, the versatile movements of the rod 4 and its activating mechanism of the supporting frame 30 enable the dentist to move said upper model teeth over the lower model teeth in the natural movements of the human jaws and thus disclose to him wherein corrections are necessary to obtain the normal occlusion of said teeth as shown in Fig. 10 of the drawings.

If the upper dental apparatus of the patient is in better condition than the lower set, then the dentist may use the surveying device attached to the base 29 of said frame 30 and adjust said flexible strip 17 to conform with the dental arch of the upper teeth in much the same manner as set forth above. This set up is shown clearly in Figs. 5 and 7 and here the dental mass is suspended from the rod 4 and affixed to the L-shaped looped rod 22 when the exact center of the dental mass is located. Then the lower model cast 27 is adjusted to conform with the position of the upper cast 27 after the surveying device has been removed as described above.

As will be seen from the above description, the invention discloses a surveying device which enables the dental practitioner to find the normal center of the dental mass by mathematical precision from which comparison and inspection of deviations may be readily ascertained.

In addition, said invention discloses to the dentist the correct and incorrect occlusion of the upper and lower dental apparatus and enables the dentist to make necessary corrections and adjustments outside the mouth of the patient.

While in disclosing the principles of my invention and its preferred embodiment, I have described various detailed structure and relationship, it will be understood that such embodiment and details are given by way of example only and not as limiting the scope of my invention.

Figures 11, 12:
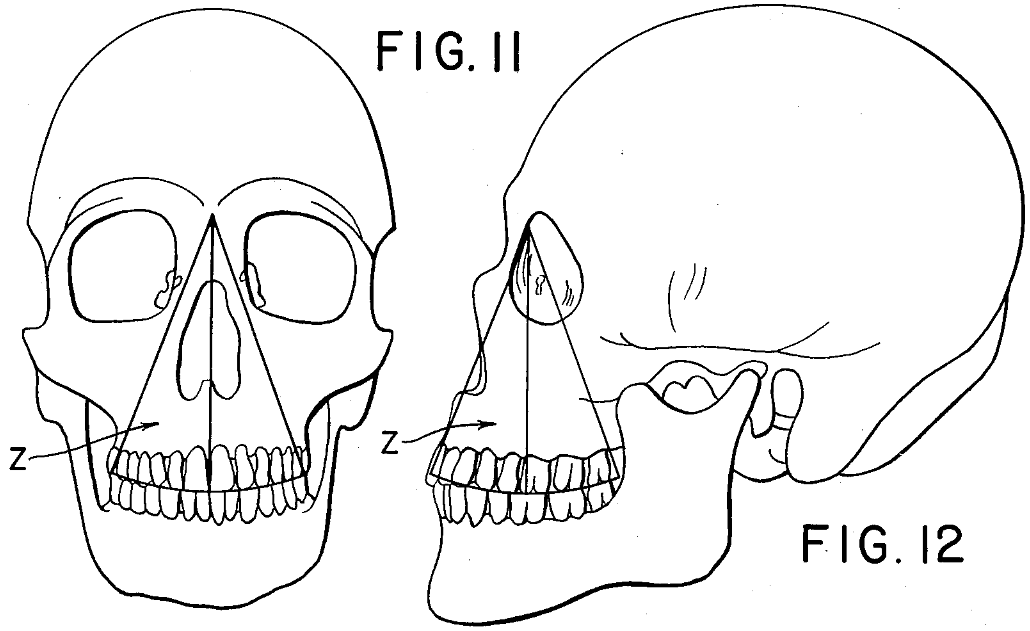
Fig. 11 is the front view of a human skull showing how the dental mass is located in the skull relative to a spherical sector.
Fig. 12 is a side view thereof.

As can be noted from Figs. 11 and 12 the dental mass of the skull is formed by nature to lie in a spherical sector Z. It is therefore appropriate that such a geometrical figure be used as a reference system in analyzing and prescribing the various corrections necessary to bring a malformed dental structure into the proper relationship with the skull and with itself. The device embodying the present invention does just this.

Figure 16:
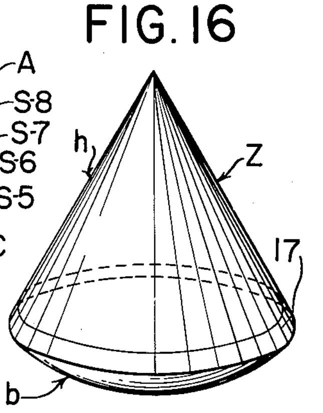
Fig. 16 is a perspective view of a spherical sector.

A spherical sector is shown in Fig. 16. The slant height of the cone *h* being the radius of a sphere and the base or cap, *b* being the segment of a sphere of a radius equal to the slant height of the cone; the apex of the cone being the center of the sphere. The strip 17, as can be seen in Fig. 11 represents the portion of the area between two concentric circles; the outer circle being of the radius of the spherical sector desired to be incorporated in the device.

The essential curvature of the strip 17 is in the outer or terminal edge thereof which comes into contact with the model or case of the dental structure. It is important that this outer edge be curved in the shape of a portion of a circle. The inner edge could be straight but in order that the strip be more easily bent to the proper configuration and in order to facilitate its being supported by the rest of the device, this inner or upper edge is also in the shape of a portion of the sphere.

This strip 17 can be laid out on a cone and becomes a portion of the side of the frustum of a cone. As has been pointed out previously the human dental arch lies in a four inch sphere. For this reason the basic spherical sector which is incorporated into this instrument is a sector of a four inch sphere.

In the instrument the strip 17 is physically held on the surface of a four inch sphere by the portions 13 of rods 11. The rods 11 move on ribs 8 and 9. These ribs are in the shape of a portion of the circumference of a three inch sphere concentric with the four inch sphere, and the length of the portions 13 of the rods 11 is one inch. Thus the lower tips of the portions 13 of the rods 11 always are positioned on the surface of a four inch sphere. If the strip 17, when used, is positioned with its lower edge touching the lower points of the portion 13, it will be positioned on the surface of a four inch sphere. However, if a wider strip is used the reference sphere embodied in the instrument will change size. If a wider strip is used on the instrument for positioning and surveying the lower arch, the sphere will be increased in radius,while a wider strip used on the instrument used for surveying and positioning the upper arch will decrease the radius.

Figure 13:
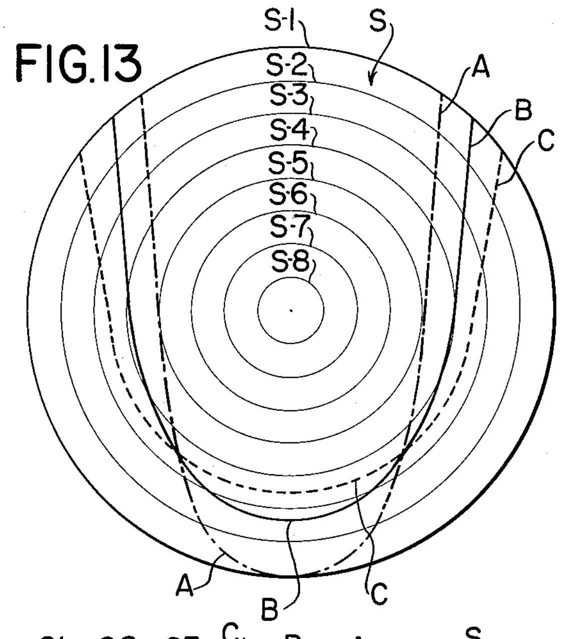
Fig. 13 is a plan view of the segment of a sphere showing the lines on the sphere where the bottom edge of the strip would lie in the sphere in their different positions of the strip.
Figure 14:
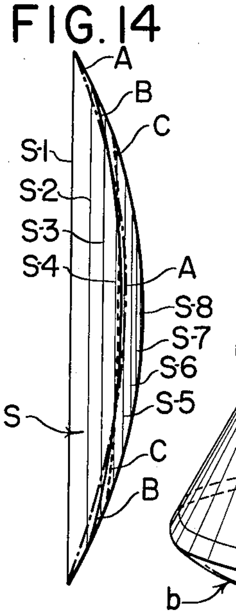
Fig. 14 is a side view thereof.
Figure 15:
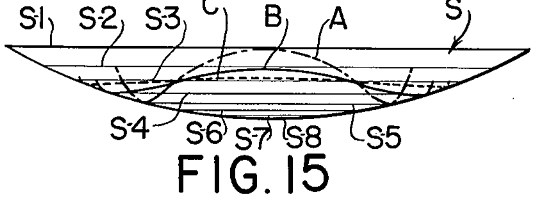
Fig. 15 is a front view thereof.

Figs. 13, 14 and 15 show the positions of the lower edge of the strip as it is bent to conform to a different width of dental arch; line A shows a narrow arch, line B a medium width arch and line C a wide arch. As these strips are bent to conform to the different width arches A, B, and C their three points held on the surface of a sphere S by rods 11, thus the entire lower edge of the strip will conform to a curved line on the surface of a sphere. These lines can represent the line of the grooves, the tips of the cusps, the gingival line, or the ridge line in edentulous cases. Figs. 14 and 15 show respectively the side and front view of the line position of the lower edge of the strip and show how it conforms to the surface of the sphere 5. It should be noted that the narrower the arch the more accentuated the curve from the horizontal planes. That this should be so can be appreciated from Fig. 13. The concentric circles, $S_1$ through $S_8$, represent lines of uniform depth on the surface of the sphere the smaller the circle the deeper the line. It can therefore be seen that the line A which crosses the highest line $S_1$ and goes over $S_5$, a line lower than any crossed by lines B and C, will have the most accentuated curve out of the horizontal plane.

It should be noted that there are three reference planes built into the device. Two are vertical planes, the median and transverse, represented by the ribs 8 and 9, and there is a horizontal plane represented by the plane tangent to the sphere at the point of intersection of the two vertical planes which is the diameter of the sphere, which forms the central axis of the instrument.

It should also be noted that by markings 19 on the strip the proper position of the teeth around the length of the arch can be ascertained. If the teeth of the patient overlap, their proper position in the arch and the exact length of arch that will be occupied by the teeth when they are finally properly positioned can be accurately and readily determined prior to any remedial steps being done by the dentist. The dentist is provided with a set of these strips; the scale markings including a graduation of sizes of teeth. By measuring one or two teeth he can then know what scale he needs and select the proper strip.

I claim:

1. A surveying device comprising a frame having a plurality of arcuate arms extending radially from a common point, with all of said arms conforming to the arc of a common sphere; a plurality of elongated members, with one thereof mounted on each of said arms for arcuate movement and with the longitudinal axis of the member directed toward the center of said sphere, and each of said members being slotted from one end thereof toward its related arm, with the slot including the longitudinal axis of the member; and a bent strip mounted within the slots of said members, said strip having an arcuate edge registered with the slotted ends of said members.

2. The surveying device of claim 1 wherein each arm is calibrated in degrees of arc.

3. The surveying device of claim 1 including means for mounting a replica of the dentition of one jaw on said frame with the biting edge of said replica adjacent the slotted ends of said members.

4. The surveying device of claim 1 wherein the radius of curvature of each arcuate arm is such that the slotted end of its related member is approximately four inches from the center of said sphere and wherein the radius of curvature of the arcuate edge of said strip is approximately four inches.

5. The surveying device of claim 1 wherein the radius of curvature of each arcuate arm is such that the slotted end of its related member is a predetermined distance from the center of said sphere and wherein the radius of curvature of the arcuate edge of said strip is equal to said distance.

6. A surveying device comprising a main frame; an auxiliary frame having a plurality of arcuate arms extending radially from a common point, with all of said arms conforming to the arc of a common sphere; a plurality of elongated members, with one thereof mounted on each of said arms for arcuate movement and with the longitudinal axis of each member directed toward the center of said sphere, and each of said members being slotted from one end thereof toward its related arm, with the slot including the longitudinal axis of the member; a bent strip mounted within the slots of said members, said strip having an arcuate edge registered with the slotted ends of said members; and means for mounting said auxiliary frame on said main frame in a predetermined relationship thereto.

7. A surveying device comprising a frame having at least three fixed arcuate arms extending radially from a common point, with one of said arms being centrally disposed with respect to the other arms, and all of said arms conforming to the arc of a common sphere; a plurality of elongated members, with one thereof mounted on each of said arms for arcuate movement and with the longitudinal axis of each member directed toward the center of said sphere, and each of said members being slotted from one end thereof toward its related arm, with the slot including the longitudinal axis of the member; and a bent strip mounted within the slots of said members, said strip having an arcuate edge registered with the slotted ends of said members.

8. A dental surveying device comprising a frame having a plurality of arcuate arms extending radially from a common point, with all of said arms conforming to arc of a common sphere; a plurality of elongated members, with one thereof mounted on each of said arms for arcuate movement and with the longitudinal axis of each member directed toward the center of said sphere; and means for mounting a replica of the dentition of one jaw on said frame with that edge of said replica which opposes the dentition of the cooperating jaw adjacent the ends of said members.

9. The dental surveying device of claim 8 wherein each arm is calibrated in degrees of arc.

10. The dental surveying device of claim 8 wherein the radius of curvature of each arcuate arm is such that ends of their related members are approximately four inches from the center of said sphere.

11. The dental surveying device of claim 8 including means for locking said members at selected positions on their related arcuate arms.

12. A dental surveying device comprising a frame having a plurality of arcuate arms extending radially from a common point, with all of said arms conforming to the arc of a common sphere; a plurality of elongated members, with one thereof mounted on each of said arms for arcuate movement and with one end and the longitudinal axis of each member directed toward the center of said sphere; another frame; and means for mounting said device and a replica of the dentition of one jaw on said other frame with that edge of said replica which opposes the dentition of the cooperating jaw in opposition to the ends of said members.

13. The surveying device of claim 1, another frame; and means for mounting said device and a replica of the dentition of one jaw on said other frame in a predetermined relationship thereto.

14. The surveying device of claim 1 including means for mounting a replica of the dentition of one jaw on said frame with the biting edge of said replica adjacent the slotted ends of said members; another frame; and means for mounting said device and replica on said other frame in a predetermined relationship thereto.

References Cited in the file of this patent

UNITED STATES PATENTS

| | | |
|---|---|---|
| 464,261 | Beehler | Dec. 1, 1891 |
| 607,295 | Talbert | July 12, 1898 |
| 828,608 | Keane | Aug. 14, 1906 |
| 838,551 | Lafleur | Dec. 18, 1906 |
| 963,445 | Kinney | July 5, 1910 |
| 1,508,811 | Perkins-Kelly | Sept. 16, 1924 |
| 1,546,667 | Lentz | July 21, 1925 |
| 1,550,339 | Branson et al. | Aug. 18, 1925 |
| 1,593,257 | Hawksworth | July 20, 1926 |
| 1,736,006 | Hagman | Nov. 19, 1929 |
| 1,753,965 | Ralph | Apr. 8, 1930 |
| 1,864,804 | Clark | June 28, 1932 |
| 2,318,403 | Karlstrom | May 4, 1943 |
| 2,367,584 | Hunt | Jan. 16, 1945 |

FOREIGN PATENTS

| | | |
|---|---|---|
| 56,841 | Germany | June 2, 1891 |
| 2,457 | Great Britain | 1882 |
| 428,641 | Germany | May 8, 1926 |